United States Patent
Kuan et al.

(10) Patent No.: US 8,899,537 B2
(45) Date of Patent: Dec. 2, 2014

(54) SUPPORTING DEVICE FOR ELECTRONIC DEVICE

(71) Applicant: Hon Hai Precision Industry Co., Ltd., New Taipei (TW)

(72) Inventors: Chang-Ming Kuan, New Taipei (TW); Ming-Chien Chiu, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 14/245,013

(22) Filed: Apr. 4, 2014

(65) Prior Publication Data
US 2014/0319304 A1   Oct. 30, 2014

(30) Foreign Application Priority Data

Apr. 30, 2013   (TW) .............................. 102207891 U

(51) Int. Cl.
| | |
|---|---|
| A47B 96/00 | (2006.01) |
| E05D 3/18 | (2006.01) |
| G06F 1/16 | (2006.01) |
| F16M 11/20 | (2006.01) |
| E05D 5/12 | (2006.01) |
| E05D 5/16 | (2006.01) |
| E05D 11/00 | (2006.01) |
| E05D 11/08 | (2006.01) |

(52) U.S. Cl.
CPC ................ *E05D 3/18* (2013.01); *G06F 1/1613* (2013.01); *F16M 11/2021* (2013.01); *E05D 5/12* (2013.01); *E05D 5/16* (2013.01); *E05D 11/00* (2013.01); *E05D 11/08* (2013.01)
USPC .............. 248/222.52; 248/223.41; 248/224.7; 248/274.1; 248/291.1; 248/292.12; 16/319; 16/321; 16/333

(58) Field of Classification Search
CPC .............. E05D 3/18; E05D 5/10; E05D 5/12; E05D 5/16; E05D 11/00; E05D 11/08; F16M 11/04; F16M 11/2021; G06F 1/1613
USPC ........... 248/454, 458, 149, 371, 372.1, 176.1, 248/188.1, 220.21, 221.11, 274.1, 276.1, 248/309.1, 346.01, 349.1, 292.1, 292.12, 248/292.13, 222.52, 223.41, 224.7; 16/319, 16/321, 327, 333, 334, 343, 344, 346
See application file for complete search history.

(56) References Cited

U.S. PATENT DOCUMENTS 6,644,611 B1 * 11/2003 Tai ............................ 248/292.13
7,517,161 B2 * 4/2009 Sukenari ....................... 396/428

(Continued)

FOREIGN PATENT DOCUMENTS

| CN | 00133366.6 | 6/2002 |
|---|---|---|
| CN | 200910212305.8 | 5/2011 |

*Primary Examiner* — Todd M Epps
(74) *Attorney, Agent, or Firm* — Novak Druce Connolly Bove + Quigg LLP

(57) ABSTRACT

A supporting device for an electronic device includes a supporting base, a guiding element, an adjusting element, and a latching assembly. The supporting base includes a sleeve portion. The adjusting element includes a first body and an adjusting portion. The adjusting portion is mounted on the sleeve portion. The adjusting portion defines a plurality of adjusting holes. The guiding element defines two latching grooves and is sleeved on the adjusting portion. The latching assembly includes a button, an adjusting rod, and a biasing element. The button is inserted into the coupling portion. The adjusting rod includes a fixing portion and a latching portion. The fixing portion is fixed with the button. The latching portion is latched with the adjusting holes. The biasing element resists the button and the sleeve portion. The button is capable of driving the adjusting rod to move.

20 Claims, 7 Drawing Sheets

(56) References Cited

U.S. PATENT DOCUMENTS

| | | | |
|---|---|---|---|
| 8,046,874 B2* | 11/2011 | Cheng | 16/324 |
| 8,074,956 B2* | 12/2011 | Wang et al. | 248/688 |
| 8,251,341 B2* | 8/2012 | Wang et al. | 248/688 |
| 8,347,462 B2* | 1/2013 | Lowry et al. | 16/362 |
| 8,640,306 B2* | 2/2014 | Hirota | 16/334 |
| 8,704,960 B2* | 4/2014 | Weaver | 348/837 |
| 8,708,298 B2* | 4/2014 | Hu et al. | 248/371 |
| 2007/0169313 A1* | 7/2007 | Chen et al. | 16/340 |
| 2008/0034543 A1* | 2/2008 | Hsu et al. | 16/346 |
| 2011/0297196 A1* | 12/2011 | Durante | 135/15.1 |
| 2012/0137470 A1* | 6/2012 | Hirota | 16/342 |

\* cited by examiner

SUPPORTING DEVICE FOR ELECTRONIC DEVICE

FIELD

The present disclosure generally relates to a supporting device, and more particularly to a supporting device for an electronic device.

BACKGROUND

With the development of science and technology, various electronic devices that are easy to carry and provide multitudes of functions are becoming more and more popular, such as panel displays and electronic books. A supporting device may support an electronic device, such as a computer monitor, digital photo frame, touch panel or the like to use for customers.

In general, the supporting device comprises a supporting base and an adjusting element. The supporting base defines a plurality of adjusting holes engaging with the adjusting element. A plurality of adjusting bulges is latched with the adjusting holes to adjust an angle of the electronic device relatively to the supporting base. When the electronic device needs to be retuned to the original state, the adjusting element is detached from one of adjusting holes and rotates relative to the supporting base, then the adjusting element is inserted into another adjusting hole to return the supporting base to its original angle.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
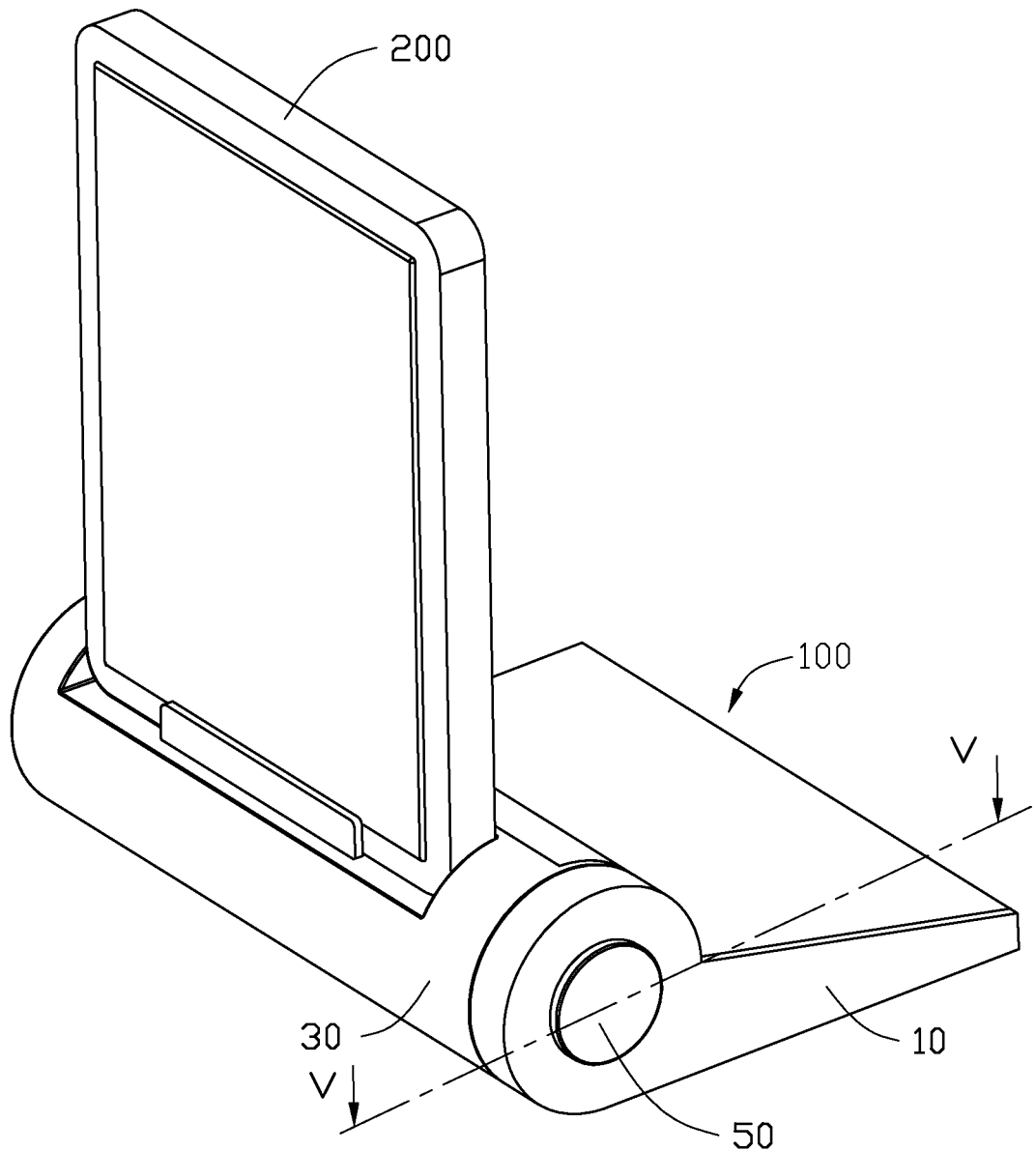
FIG. 1 is a first isometric view for a supporting device having an electronic device installed thereon.

The disclosure is illustrated by way of example and not by way of limitation in the figures of the accompanying drawings in that like reference numerals indicate similar elements. It should be noted that references to "an" or "one" embodiment in this disclosure are not necessarily to the same embodiment, and such references can mean "at least one."

In the following disclosure the term "coupled" is defined as coupled, whether directly or indirectly through intervening components, and is not necessarily limited to physical connections. The connection can be such that the objects are permanently coupled or releasably coupled.

Figure 2:
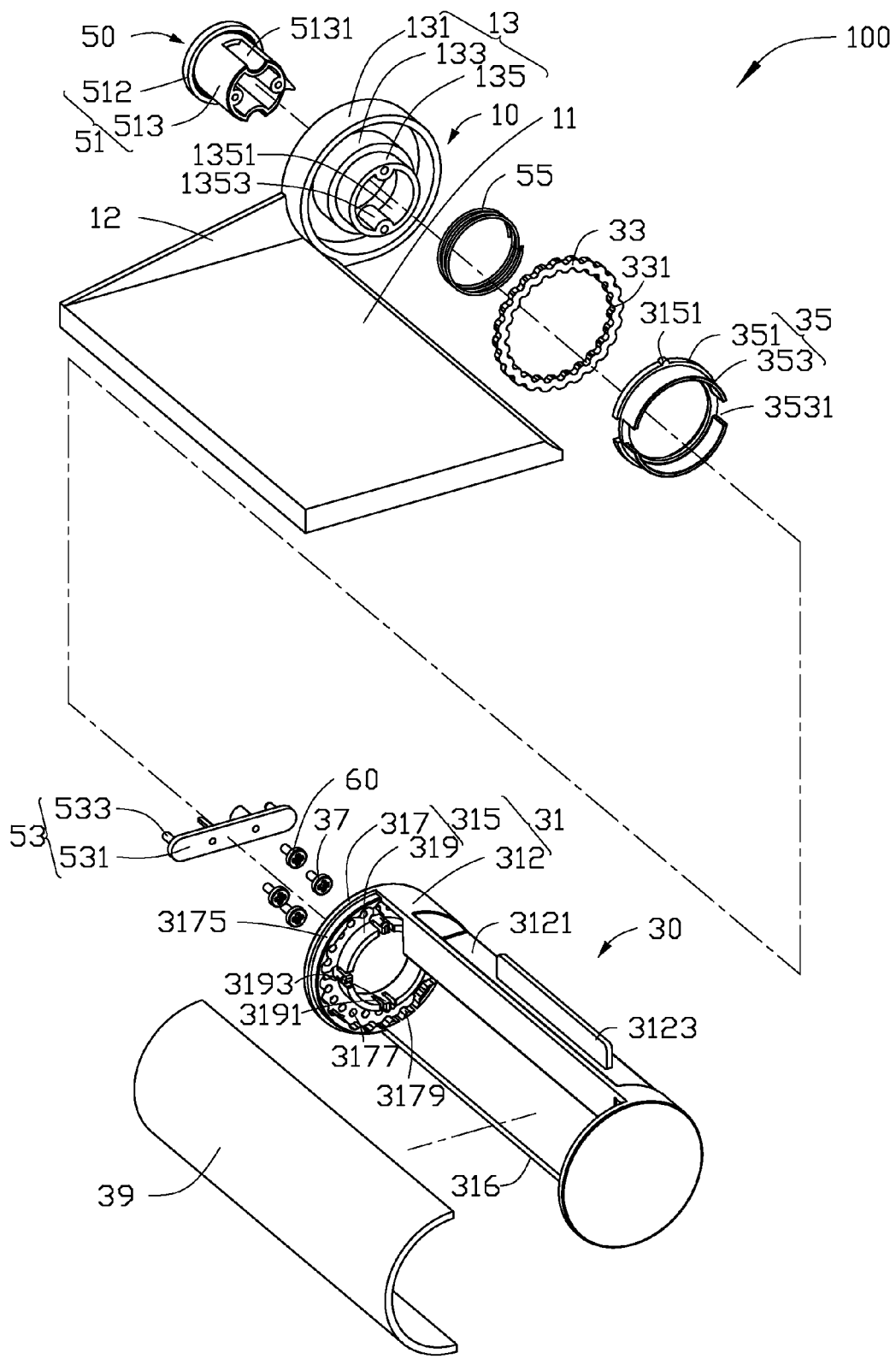
FIG. 2 is an exploded, isometric view in one angle of the supporting device of FIG. 1.

FIG. 1 and FIG. 2 illustrate a supporting device 100 for supporting an electronic device 200. In one embodiment, the electronic device 200 can be configured to be easily carried and perform multiple functions. The electronic device 200 can include a touch screen. The supporting device 100 comprises a supporting base 10, an adjusting assembly 30 and a latching assembly 50. The electronic device 200 is not limited to a panel computer, and can be a telephone with touch screen, a digital photo frame, a liquid crystal display or the like to use by consumers.

Figure 3:
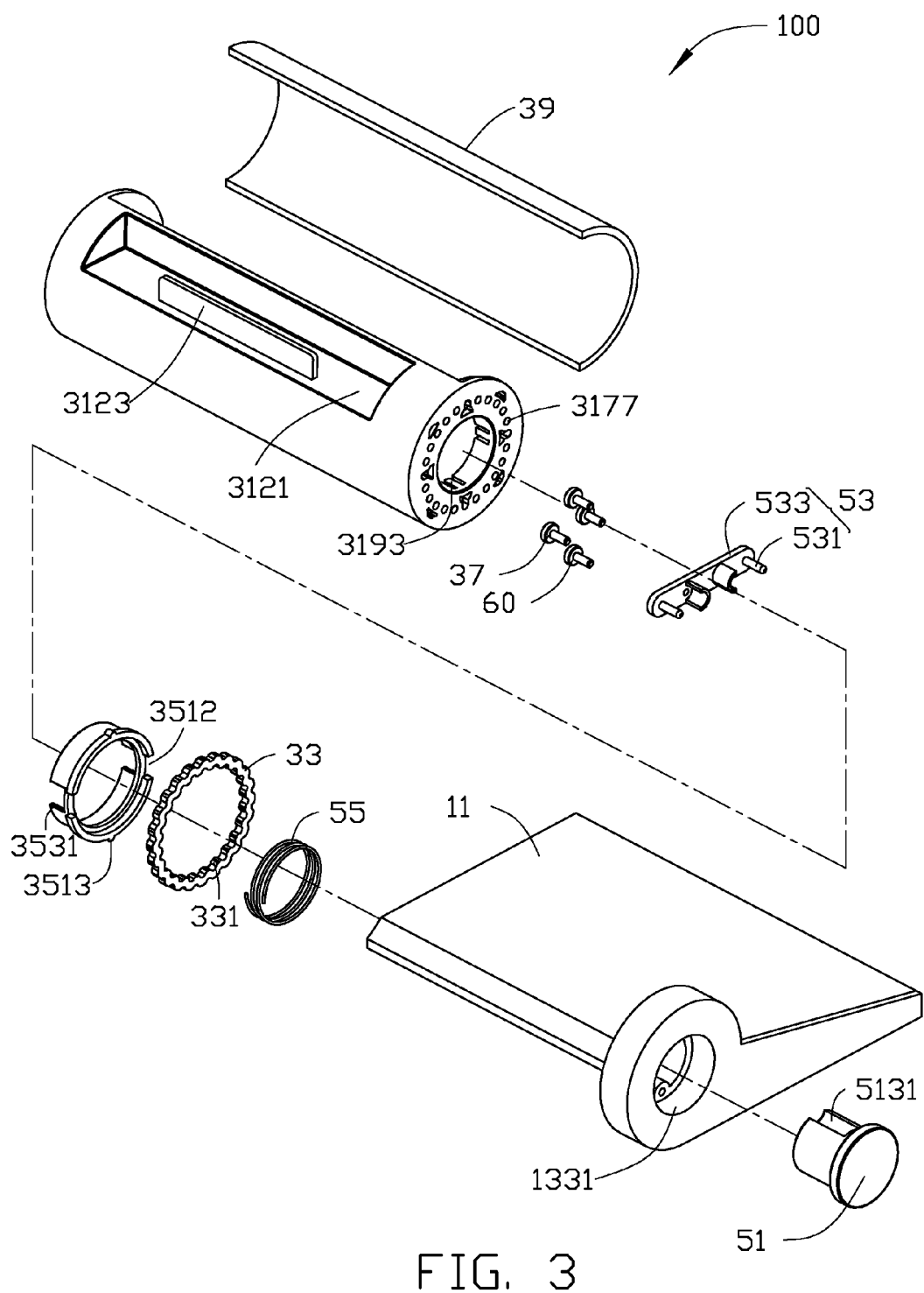
FIG. 3 is another exploded, isometric view in another angle of the supporting device of FIG. 1.

FIG. 2 and FIG. 3 illustrate that the supporting base 10 comprises a supporting portion 11, a mounting portion 12 and a coupling portion 13 extending from the mounting portion 12. The supporting portion 11 can be a rectangular shape and used to support the electronic device 200. The mounting portion 12 is vertically coupled to an edge of the supporting portion 11. The coupling portion 13 is formed on a side of the mounting portion 12 and couples with the supporting portion 11. The coupling portion 13 is in shape of hollow cylinder with steps. The coupling portion 13 comprises a protecting cover 131, a middle portion 133 and a sleeve portion 135. The middle portion 133 extends from a side of the protecting cover 131. In the illustrated embodiment, the protecting cover 131, the middle portion 133 and the sleeve portion 135 are in a same axis. A first hole 1331 (see FIG. 5) is defined in the protecting cover 131 and passes though the middle portion 133. A second hole 1351 is defined in the sleeve portion 135 and communicates with the first hole 1331. In the illustrated embodiment, an aperture of the first hole 1331 is greater than an aperture of the second hole 1351. Two sliding bulges 1353 are defined on an inner surface of the second hole 1351 of the sleeve portion 135.

Figure 4:
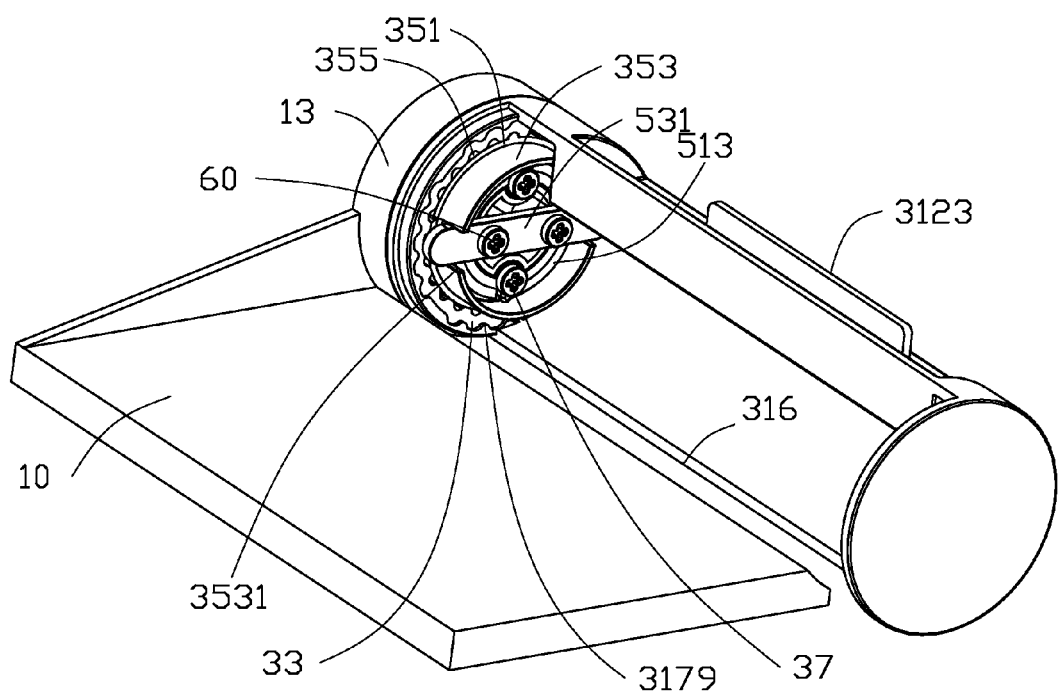
FIG. 4 is a partially assembly, isometric view without a cover of the supporting device of FIG. 3.
Figure 5:
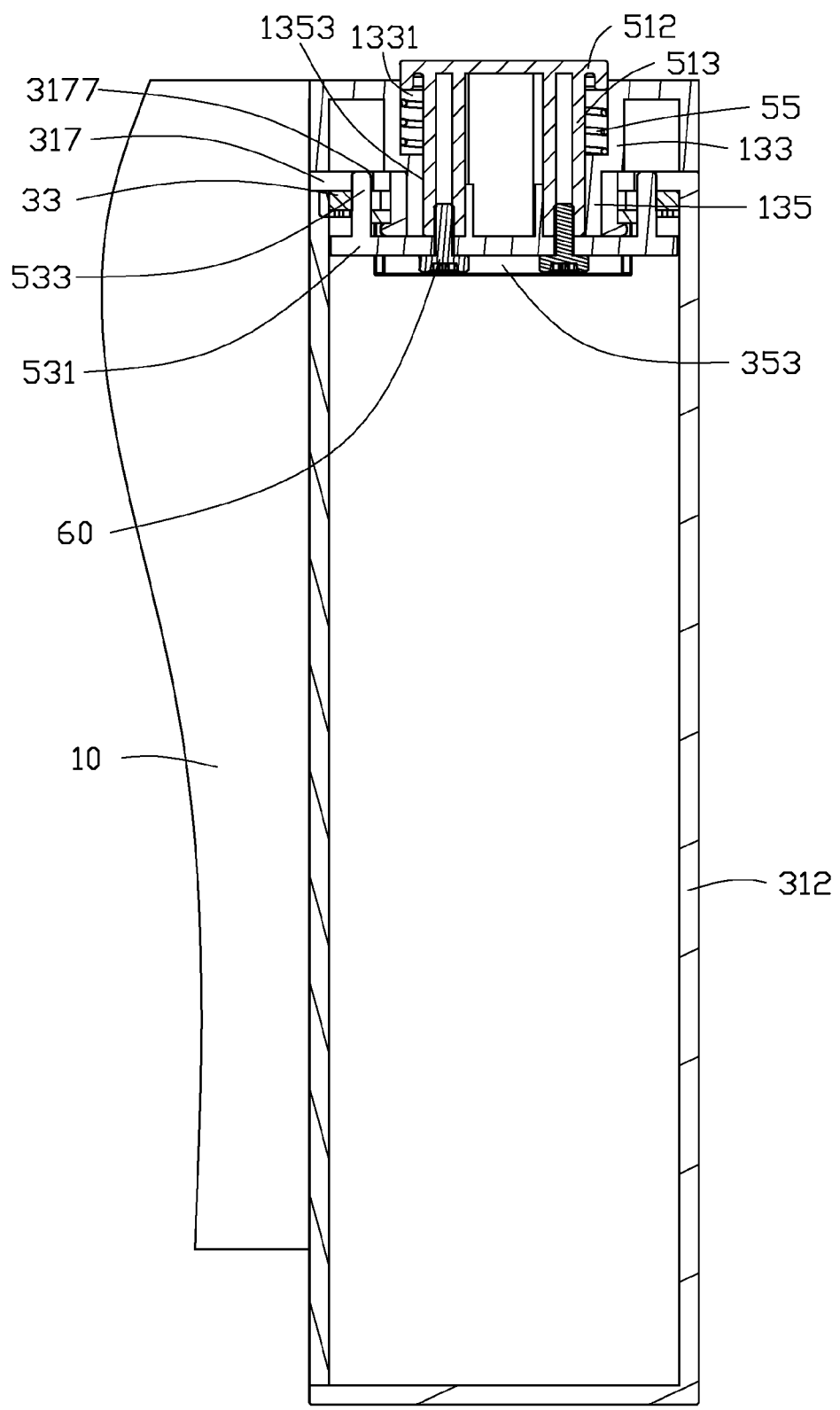
FIG. 5 is a partial cross-sectional view taken along line V-V of the supporting device of FIG. 3.

FIG. 4 and FIG. 5 illustrate that the adjusting assembly 30 comprises an adjusting element 31, an attrition element 33, a guiding element 35, a fixing element 37 and a cover 39. The adjusting element 31 is in shape of hollow sleeve and mounted on the supporting base 10. The adjusting element 31 comprises a first body 312 and a pair of adjusting portion 315 extending from one end of the first body 312. The first body 312 is in shape of hollow sleeve and defines a slot 316. A position groove 3121 is defined on the outside of the first body 312 away from the slot 316. The electronic device 200 is inserted into the position groove 3121. A supporting bulge 3123 is located on a bottom of the position groove 3121 and latched with the electronic device 200.

The adjusting portion 315 is sleeved on the sleeve portion 135. The adjusting portion 315 is in hollow disk shape and comprises a second body 317, a linking portion 319 extending from the second body 317 to the first body 312. The second body 317 is in hollow disk shape and couples to the edge of the first body 312. The second body 317 and the linking portion 319 are sleeved on the sleeve portion 135. A plurality of adjusting holes 3177 is defined on the second body 317 which locates around the linking portion 319. A position portion 3175 is defined on an inner surface of the second body 317 and around the linking portion 319. A plurality of installing grooves 3179 is defined on an inner surface of the position portion 3175 and is located on a same side with the linking portion 319. The linking portion 319 is in hollow cylinder shape and has a same axis with the second body 317. The linking portion 319 defines four grooves 3191 which pass through the second body 317 of the adjusting portion 315. A spacing bulge 3193 vertically extends from the bottom of each groove 3191. The spacing bulge 3193 is a resilient bulge and in "L" shape.

The attrition element 33 is mounted on the second body 317 of the adjusting portion 315 and engages with the installing grooves 3179 of the position portion 3175. A plurality of recesses 331 are defined on an inner surface of the attrition element 33. In the illustrated embodiment, the attrition element 33 is a ring in material of rubber. That is, attrition element 33 may be other elastomeric material.

The guiding element 35 is in shape of hollow sleeve with steps. The guiding element 35 is sleeved on the linking portion 319 and latched with the spacing bulge 3193. The guiding element 35 comprises an installing portion 351 in circular shape and a spacing portion 353 extending from the installing portion 351. The installing portion 351 is sleeved on the linking portion 319 and retained to the spacing bulge 3193 to rotate relatively to the spacing bulge 3193. The installing portion 351 of the guiding portion 35 has an interval with the attrition element 33 to form an adjusting space 355 (see FIG. 4) communicating with the plurality of adjusting holes 3177. A position bulge 3513 is defined on the outside of the installing portion 351 and the position bulge 3513 engages with the recesses 331 of the attrition element 33. The spacing portion 353 is out of the linking portion 319 and defines two latching grooves 3531 located opposite to each other.

The fixing element 37 is mounted on the sliding bulges 1353 of the sleeve portion 135 of the supporting base 10 and away from the middle portion 133, which partly resists the spacing bulge 3193 of the adjusting element 31 to prevent the linking portion 319 of the adjusting element 31 from being detached from the sleeve portion 135. The cover 39 is located on the slot 316 of the first body 312 to prevent dust from entering the first body 312.

The latching assembly 50 comprises a button 51, an adjusting rod 53 and a biasing element 55. The button 51 is mounted on the sleeve portion 135 and comprises a pressing portion 512 and a guiding portion 513 extending from the pressing portion 512. The pressing portion 512 is received in the first hole 1331. The guiding portion 513 passes through the first hole 1331 and the second hole 1351. Two sliding grooves 5131 are concave and located on the outside of the guiding portion 513, and the sliding grooves 5131 engage with the sliding bulges 1353 to make the guiding portion 513 to slide along the sliding bulges 1353 to make the button 51 to rotate relatively to the supporting base 10.

The adjusting rod 53 fixes with one end of the guiding portion 513 which is away from the pressing portion 512 and partly received in the latching grooves 3531 of the guiding element 35 and partly received in the adjusting holes 3177. The adjusting rod 53 comprises a fixing portion 531 and two latching portions 533 extending from the fixing portion 531. The fixing portion 531 is located adjacent to the spacing portion 353. A middle portion of the fixing portion 531 of the adjusting rod 53 fixes with an end of the guiding portion 513 of the button 51 via a plurality of screws 60. Two ends of the fixing portion 531 are respectively latched with the latching grooves 3531 and partly out of the guiding element 35. The latching portions 533 vertically extend from the ends of the fixing portion 531, and pass through the adjusting space 355 and are latched with the adjusting holes 3177. The button 51 drives the latching portions 533 of the adjusting rod 53 to detach from the adjusting holes 3177 and slide along the adjusting space 355.

The biasing element 55 is sleeved on the guiding portion 513 and received in the first hole 1331. The biasing element 55 is retained between the pressing portion 512 of the button 51 and the sleeve portion 135 of the coupling portion 13 to make the button 51 to return to the original state.

In assembly of the supporting device 100, the attrition element 33 is mounted on the second body 317 and engages with the installing grooves 3179 of the position portion 3175.

The installing portion 351 of the guiding element 35 is sleeved on the linking portion 319, the guiding bulge 3512 is retained to the spacing bulge 3193 and the spacing portion 353 is out of the linking portion 319.

The fixing element 37 is mounted on the sliding bulges 1353 of the supporting base 10 which is away from the middle portion 133 and retained to the spacing bulge 3193 of the adjusting element 31.

The second body 317 and the linking portion 319 is mounted on the sleeve portion 135, the biasing element 55 is sleeved on the guiding portion 513, the guiding portion 513 of the button 51 passes through the first hole 1331 and the second hole 1351. The fixing portion 531 of the adjusting rod 53 is fixed with the guiding portion 513 of the button 51 via screws 60 and the ends of which passes through the latching grooves 3531. The latching portions 533 pass through the adjusting space 355 and are latched with the adjusting holes 3177.

The cover 39 is covered on the slot 316 of the first body 312.

Figure 6:
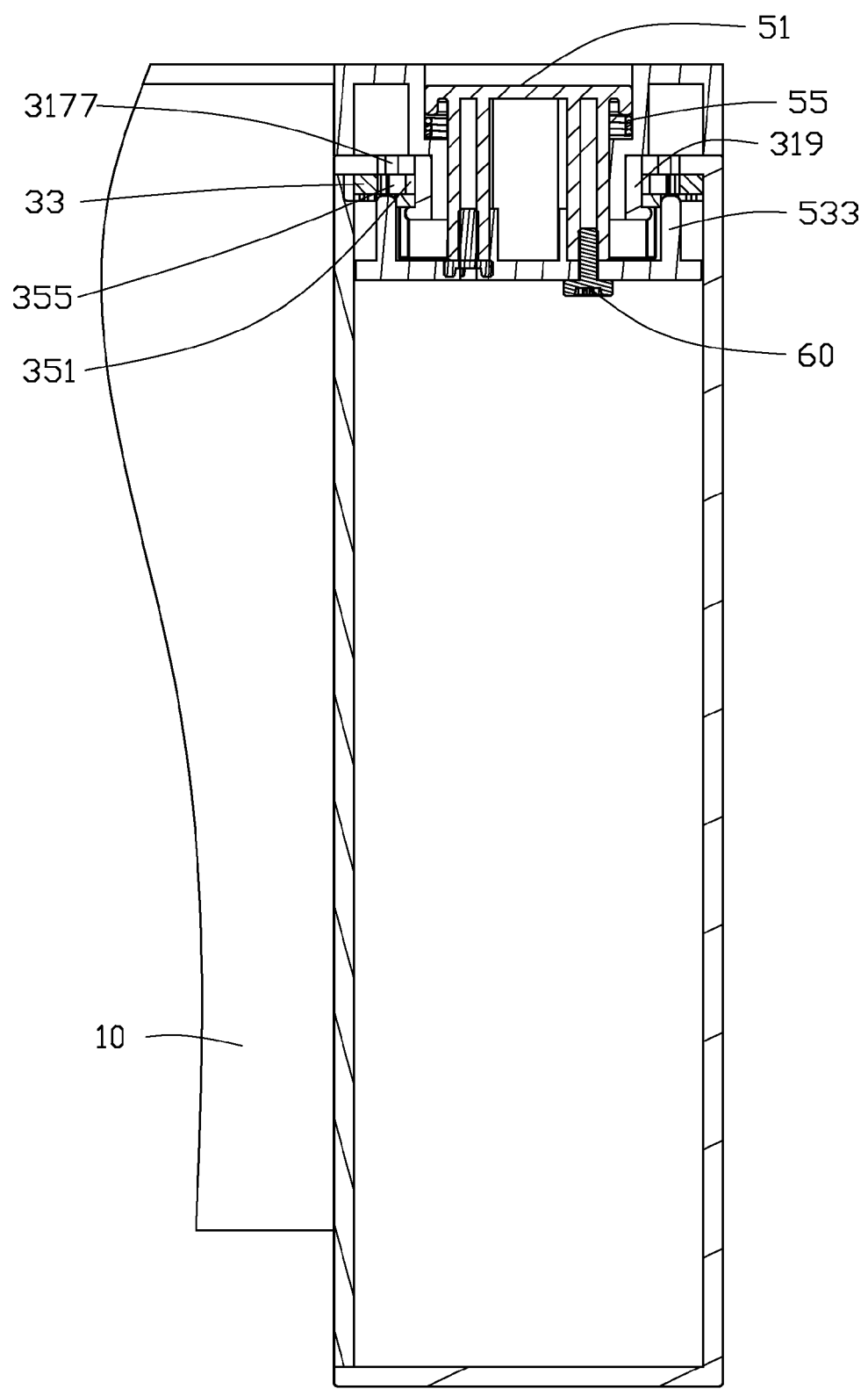
FIG. 6 is an isometric view during adjustment of the angle of the supporting device of FIG. 5.
Figure 7:
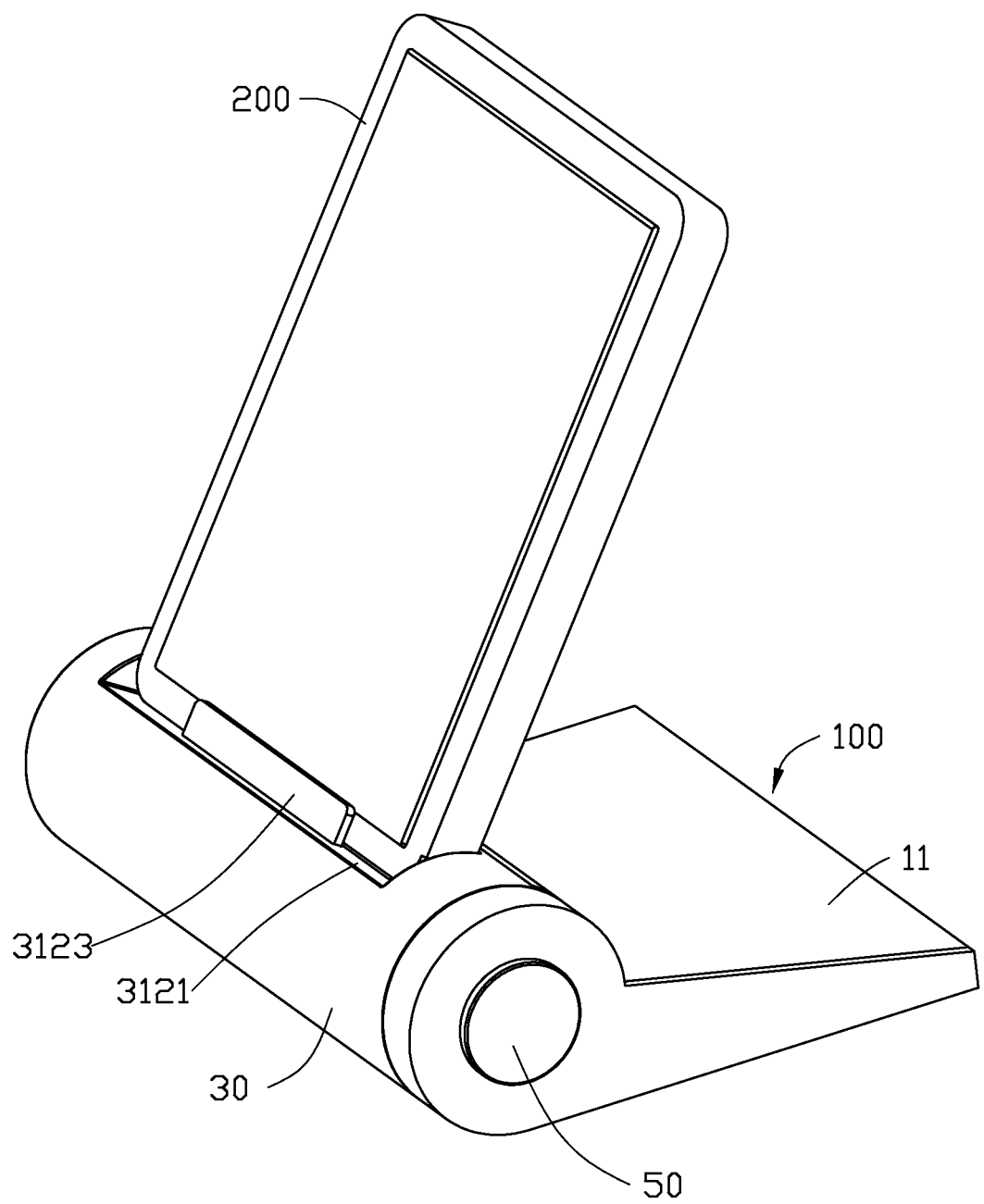
FIG. 7 is a second isometric view for ready used of a supporting device for an electronic device installed thereon.

Use of the supporting device 100 will now be described with particular reference to FIGS. 5-7. In use, the electronic device 200 is inserted into the position groove 3121 and the supporting bulge 3123 is retained in the electronic device 200. When a different angle of the electronic device 200 is desired, the button 51 can be pressed to drive the adjusting rod 53 to move. The latching portions 533 are detached from the adjusting holes 3177 and located in the adjusting space 355. Then, the adjusting element 31 is rotated relatively to the adjusting rod 53 and the guiding element 35 to make the latching portion 533 to slide along the adjusting space 355. When a suitable angle is achieved, the button 51 can be released so that the button 51 and the adjusting rod 53 are reset under elastic force of the biasing element 55. The latching portions 533 are latched with the adjusting holes 3177 to position a preset angle of the adjusting element 31 relative to the supporting base 10.

When it is desired to return the electronic device 200 to the preset angle quickly, the button 51 can be pressed so that the button 51 drives the adjusting rod 53 to slide along the adjusting portion 315, the latching portions 533 are detached from the adjusting holes 3177, the fixing portion 531 is detached from the latching groove 3531, the adjusting element 31 is capable of adjusting the angle of the adjusting element 31 relative to the supporting base 10. When the button 51 is released, the button 51 and the adjusting rod 53 are reset under elastic force of the biasing element 55, the fixing portion 531 is retained to the guiding element 35 to position the preset angle.

When electronic device needs to be retuned to the original state, rotate the adjusting element 31 relatively to the supporting base 10, the fixing portion 531 slides along the guiding element 35 and is latched with the latching groove 3531, and the latching portions 533 are latched with the adjusting holes 3177.

In the illustrated embodiment, the second body 317 of the adjusting element 31 of the supporting device 100 is sleeved on the sleeve portion 135 and defines the plurality of adjusting holes 3177, guiding element 35 is sleeved on the linking portion 319 and defines two latching grooves 3531, the button 51 of the latching assembly 50 is sleeved on the sleeve portion 135 and fixes with the fixing portion 531 of the adjusting rod 53, the fixing portion 531 is latched with the latching grooves 3531, and the latching portions 533 are latched with the adjusting holes 3177. The guiding element 31 can guide the adjusting element 31 to original state, rotate the adjusting element 31 relatively to the supporting base 10, the fixing portion 531 of the adjusting rod 53 slides along the guiding element 35 and is latched with the latching grooves 3531, the latching portions 533 are latched with the adjusting holes 3177 to make the adjusting element to original state, quickly, exactly and conveniently for operation. The biasing element 55 is sleeved on the guiding portion 513, the ends of which are retained to the pressing portion 512 and the sleeve portion 135 of the supporting base 10 to keep the latching portions 533 of the latching assembly 50 being latched with the adjusting holes 3177 of the adjusting assembly 30 under elastic force of the biasing element 55, which make the supporting device 100 to position stable and lengthen the life of the supporting device 100.

In other embodiments, the attrition element 33, the fixing element 37, the cover 39 and the screws 60 can be omitted. The supporting porting 11 can be omitted and the coupling portion 13 is designed to a corresponding shape to support for the electronic device 200. The number of the latching grooves 3531 and the latching portions 533 is not limited to 2, it can be 1 or 3 or another number. The pressing portion 512 of the button 51 can be omitted and one end of the biasing element 55 is designed to be sleeved on the button 51, the other end of the biasing element 55 is retained to the sleeve portion 135 of the supporting base 10. Likewise, the guiding element 35 can be omitted, and the fixing portion 531 of the adjusting rod 53 is retained to the linking portion 319 and latching portions 533 of the adjusting rod 53 is designed to a corresponding size.

Although various features and elements are described as embodiments in particular combinations, each feature or element can be used alone or in other various combinations within the principles of the present disclosure to the full extent indicated by the broad general meaning of the terms in which the appended claims are expressed.

What is claimed is:

1. A supporting device, comprising:
a supporting base comprising a sleeve portion;
an adjusting element comprising a first body, an adjusting portion mounted on the sleeve portion comprising a second body and a linking portion extending from the second body, a position portion defined on an outside surface of the first body, and a plurality of adjusting holes defined on the second body;
a guiding element sleeved on the adjusting portion and defining two latching grooves; and
a latching assembly comprising a button inserted into the adjusting portion, an adjusting rod comprising a fixing portion extending from the button and two latching portions fixed with the fixing portion, and a biasing element resisting the button and the sleeve portion;
wherein when the button is pressed, the button drives the adjusting rod to move away from the adjusting portion, the latching portions are detached from the adjusting holes, the fixing portion is detached from the latching grooves, and the adjusting element is capable of being rotated to adjust an angle of an electric device;
wherein when the button is released, the adjusting rod and the button return to an original state, the fixing portion resists a top of the guiding element to set the angle in advance;
wherein when the electronic device is to be returned to the original state, the adjusting element is rotated to make the fixing portion slide along the guiding element, and the latching portions are latched with the latching grooves and the adjusting holes.

2. The supporting device of claim 1, wherein the supporting base further comprises a coupling portion comprising a protecting cover and a middle portion extending out of the protecting cover, and the sleeve portion is sleeved on the middle portion and away from the protecting cover.

3. The supporting device of claim 2, wherein the protecting cover defines a first hole passing through the middle portion; and a second hole is defined on the sleeve portion and communicates with the first hole.

4. The supporting device of claim 3, wherein the button comprises a pressing portion and a guiding portion extending from the pressing portion, the pressing portion is received in the first hole, the guiding portion passes through the first hole and the second hole, the guiding portion fixes with the fixing portion of the adjusting rod, and the biasing element is sleeved on the guiding portion, received in the first hole and resists between the pressing portion and the sleeve portion.

5. The supporting device of claim 3, wherein two sliding bulges are defined on an inner surface of the second hole of the sleeve portion, two sliding grooves are located concavely on an outside of the guiding portion, and the sliding grooves engage with the sliding bulges to make the guiding portion to slide along the sliding bulges to make the button to rotate relatively to the supporting base.

6. The supporting device of claim 1, wherein a position portion is defined on an inner surface of the second body of the adjusting portion and around the linking portion, and a plurality of installing grooves is defined on an inner surface of the position portion and is located on a same side with the linking portion.

7. The supporting device of claim 1, further comprising an attrition element, wherein the attrition element is mounted on the second body of the adjusting portion and the installing groove engages with an edge of the attrition element.

8. The supporting device of claim 7, wherein the guiding element comprises an installing portion in circular shape and a spacing portion extending from the installing portion, the latching grooves are defined on the spacing portion, the installing portion is sleeved on the linking portion and has an interval with the attrition element to form an adjusting space communicating with the plurality of adjusting holes, the latching portions of the adjusting rod are capable of being detached from the adjusting holes and moving along the adjusting space.

9. The supporting device of the claim 8, wherein four grooves pass from the linking portion to the second body of the adjusting portion, a spacing bulge vertically extends from a bottom of one of the four grooves, and the installing portion resists the spacing bulge to make the installing portion to rotate relatively to the spacing bulge.

10. The supporting device of claim 9, wherein a plurality of recesses is defined in an inner surface of the attrition element, a position bulge is defined on an outside of the installing portion and the position bulge engages with the recesses of the attrition element.

11. The supporting device of claim 2, wherein the supporting base further comprises a supporting portion and a mounting portion extending from an edge of the supporting portion and coupling to the protecting cover.

12. The supporting device of claim 9, wherein the supporting device further comprises a fixing element mounted on one side of the sleeve portion and partly resists the spacing bulge of the adjusting element to prevent the linking portion of the adjusting element from being detached from the sleeve portion.

13. The supporting device of claim 1, wherein a slot is defined on a side of the first body and a cover is located on the slot to prevent dust from entering the first body.

14. A supporting device for an electronic device, comprising:
an electronic device;
a supporting base used to support for the electronic device and comprising a sleeve portion;
an adjusting element comprising a first body, an adjusting portion mounted on the sleeve portion, a position portion defined on an outside surface of the first body, a plurality of adjusting holes defined on the first body, and the adjusting portion comprising a second body and a linking portion extending from the second body;
a guiding element sleeved on the adjusting portion and defining two latching grooves; and
a latching assembly comprising a button inserted into the adjusting portion, an adjusting rod comprising a fixing portion fixed with the button and two latching portions extending from the fixing portion, and a biasing element resisting the button and the sleeve portion;
wherein when press the button, the button drives the adjusting rod to move away from the adjusting portion, the latching portions are detached from the adjusting holes, the fixing portion is detached from the latching grooves, and the adjusting element is capable of being rotated to adjust an angle of the electronic device;
wherein when the button is released, the adjusting rod and the button return to an original state, the fixing portion resists a top of the guiding element to set the angle in advance; and
wherein when the electronic device is needed to be returned to the original state, the adjusting element is rotated to make the fixing portion slide along the guiding element, and the latching portions are latched with the latching grooves and the adjusting holes.

15. The supporting device for an electronic device of claim 14, wherein the supporting base further comprises a supporting portion used to support for the electronic device, a coupling portion comprising a protecting cover, a middle portion extending out of the protecting cover, a mounting portion extending from an edge of the supporting portion and coupling to the protecting cover, the sleeve portion is sleeved on the middle portion and away from the protecting cover, the protecting cover defines a first hole passing through the middle portion, and a second hole is defined on the sleeve portion and communicates with the first hole.

16. The supporting device for an electronic device of claim 15, wherein the button comprises a pressing portion and a guiding portion extending from the pressing portion, the pressing portion is received in the first hole, the guiding portion passes through the first hole and the second hole, the guiding portion fixes with the fixing portion of the adjusting rod, and the biasing element is sleeved on the guiding portion, received in the first hole and resists between the pressing portion and the sleeve portion.

17. The supporting device for an electronic device of claim 16, wherein two sliding bulges are defined on an inner surface of the second hole of the sleeve portion, two sliding grooves are located concavely on an outside of the guiding portion, and the sliding grooves engage with the sliding bulges to make the guiding portion to slide along the sliding bulges to make the button to rotate relatively to the supporting base.

18. The supporting device for an electronic device of claim 14, wherein a position portion is defined on an inner surface of the second body of the adjusting portion and around the linking portion, a plurality of installing grooves is defined on an inner surface of the position portion and is located on a same side with the linking portion; the supporting device for an electronic device further comprises an attrition element, and the attrition element is mounted on the second body of the adjusting portion and the installing grooves engage with an edge of the attrition element.

19. The supporting device for an electronic device of claim 18, wherein the guiding element comprises an installing portion in circular shape and a spacing portion extending from the installing portion, the latching grooves are defined on the spacing portion, the installing portion is sleeved on the linking portion and has an interval with the attrition element to form an adjusting space communicating with the plurality of adjusting holes, the latching portions of the adjusting rod is capable of being detached from the adjusting holes and moving along the adjusting space; wherein four grooves pass from the linking portion to the second body of the adjusting portion, a spacing bulge vertically extends from a bottom of one of the four grooves, and the installing portion resists the spacing bulge to rotate relatively to the spacing bulge; wherein a plurality of recesses are defined in an inner surface of the attrition element, a position bulge is defined on an outside of the installing portion and the position bulge engages with the recesses of the attrition element.

20. The supporting device for an electronic device of claim 19, wherein the supporting device further comprises a fixing element mounted on one side of the sleeve portion and resists the spacing bulge of the adjusting element to prevent the linking portion of the adjusting element from being detached from the sleeve portion, and a slot is defined on a side of the first body and a cover is located on the slot to prevent dust from entering the first body.

* * * * *